United States Patent
Berthold et al.

(12)

(10) Patent No.: US 6,713,561 B1
(45) Date of Patent: Mar. 30, 2004

(54) POLYETHYLENE MOULDING COMPOUND WITH AN IMPROVED ESCR/STIFFNESS RELATION AND AN IMPROVED SWELLING RATE, A METHOD FOR THE PRODUCTION THEREOF AND THE USE THEREOF

(75) Inventors: Joachim Berthold, Kelkheim (DE); Ludwig Böhm, Hattersheim (DE); Johannes-Friedrich Enderle, Frankfurt (DE); Reinhard Schubbach, Bergen (DE)

(73) Assignee: Basell Polyolefine GmbH (DE)

( * ) Notice: Subject to any disclaimer, the term of this patent is extended or adjusted under 35 U.S.C. 154(b) by 15 days.

(21) Appl. No.: 10/088,855

(22) PCT Filed: Sep. 9, 2000

(86) PCT No.: PCT/EP00/08817

§ 371 (c)(1),
(2), (4) Date: Mar. 21, 2002

(87) PCT Pub. No.: WO01/23446

PCT Pub. Date: Apr. 5, 2001

(30) Foreign Application Priority Data

Sep. 24, 1999 (DE) .......................... 199 45 980

(51) Int. Cl.[7] .............. C08F 10/02; C08F 2/00; C08F 23/16; C08L 23/00; C08L 23/06
(52) U.S. Cl. .................. 525/191; 525/193; 525/240
(58) Field of Search .................. 525/193, 240

(56) References Cited

U.S. PATENT DOCUMENTS 4,336,352 A 6/1982 Sakurai et al.
4,447,587 A 5/1984 Berthold et al. ............. 526/124
5,338,589 A 8/1994 Bohm et al. ................. 428/36.9
5,422,400 A 6/1995 Kamiyama et al. ......... 525/240
5,648,309 A 7/1997 Bohm .......................... 502/105

FOREIGN PATENT DOCUMENTS

| EP | 0129312 | 12/1984 |
| EP | 0401776 | 12/1990 |
| EP | 0603935 | 6/1994 |
| EP | 0797599 | 10/1997 |
| EP | 0905151 | 3/1999 |
| GB | 2056996 | 3/1981 |

Primary Examiner—Nathan M. Nutter
(74) Attorney, Agent, or Firm—Connolly Bove Lodge & Hutz LLP

(57) ABSTRACT

The invention relates to a polyethylene moulding compound having a multimodal molecular weight distribution which has an overall density of $\geq 0.940$ g/cm$^3$ and an MFI$_{190/5}$ in the range from 0.01 to 10 dg/min. The moulding compound according to the invention comprises an amount of from 30 to 60% by weight of low-molecular-weight ethylene homopolymer A which has a viscosity number VN$_A$ in the range from 40 to 150 cm$^3$/g, an amount of from 30 to 65% by weight of high-molecular-weight copolymer B comprising ethylene and a further olefin having from 4 to 10 carbon atoms which has a viscosity number VN$_B$ in the range from 150 to 800 cm$^3$/g, and an amount of from 1 to 30% by weight of ultrahigh-molecular-weight ethylene homopolymer C which has a viscosity number VN$_C$ in the range from 900 to 3000 cm$^3$/g.

The invention also relates to a method for the production of the moulding compound in a three-step process, and to the use thereof for the production of hollow articles.

12 Claims, No Drawings

POLYETHYLENE MOULDING COMPOUND WITH AN IMPROVED ESCR/STIFFNESS RELATION AND AN IMPROVED SWELLING RATE, A METHOD FOR THE PRODUCTION THEREOF AND THE USE THEREOF

This application is a 371 of International Application PCT/EP00/08817 filed Sep. 9, 2000, which published as WO 01/23446 on Apr. 5, 2001 and which claims priority to German Application No. 199 45 980.0, filed Sep. 24, 1999.

The present invention relates to a polyethylene moulding compound having a multimodal molecular weight distribution and to a method for the production of this moulding compound in the presence of a catalytic system comprising a Ziegler catalyst and co-catalyst via a multistep reaction sequence consisting of successive liquid-phase polymerizations, and to hollow articles produced from the moulding compound by extrusion blow moulding.

Polyethylene is widely used for the production of mouldings and containers since it is a material having a low inherent weight which nevertheless has particularly high mechanical strength, high corrosion resistance to moisture and water in combination with atmospheric oxygen and absolutely reliable long-term resistance and since polyethylene has good chemical resistance and in particular can easily be processed for bottles, canisters and fuel tanks in motor vehicles.

EP-A-603,935 has already described a moulding compound based on polyethylene which has a bimodal molecular weight distribution and which is also suitable, inter alia, for the production of pipes.

A raw material having an even broader molecular weight distribution is described in U.S. Pat. No. 5,338,589 and is prepared using a highly active catalyst disclosed in WO 91/18934 in which magnesium alkoxide is employed in the form of a gelatinous suspension. Surprisingly, it has been found that the use of this material in mouldings, in particular in pipes, facilitates a simultaneous improvement in the properties of stiffness and creep tendency, which are usually contradictory in partially crystalline thermoplastics, on the one hand, and stress cracking resistance and toughness on the other hand.

The known bimodal products are distinguished, in particular, by good processing properties at the same time as an outstanding stress cracking/stiffness ratio. This combination of properties is of particular importance in the production of hollow articles from plastics, such as bottles, canisters and fuel tanks in motor vehicles. In addition to this property combination, however, the production of plastic hollow articles requires the highest possible swelling rate of the plastic melt, since the swelling rate is directly responsible for enabling the optimum setting of wall thickness control, the formation of the weld line and the weldability in industrial production in extrusion blow moulding.

It is known that having high swelling rates can be produced well using so-called Phillips catalysts, i.e. polymerization catalysts based on chromium compounds. However, the plastics produced in this way have an unfavourable stress cracking/stiffness ratio compared with the known plastics having a bimodal molecular weight distribution.

EP-A-0 797 599 discloses a process which even gives a polyethylene having a trimodal molecular weight distribution in successive gas-phase and liquid-phase polymerizations. Although this polyethylene is already very highly suitable for the production of hollow articles in extrusion blow moulding plants, it is, however, still in need of further improvement in its processing behaviour owing to the plastic melt swelling rate, which is still too low.

The object of the present invention was the development of a polyethylene moulding compound by means of which an even better ratio of stiffness to stress cracking resistance compared with all known materials can be achieved and which, in addition, has a high swelling rate of its melt, which, in the production of hollow articles by the extrusion blow moulding process, not only enables optimum wall thickness control, but at the same time also facilitates excellent weld line formation and wall thickness distribution.

This object is achieved by a moulding compound of the generic type mentioned at the outset, whose characterizing features are to be regarded as being that it comprises from 30 to 60% by weight of a low-molecular-weight ethylene homopolymer A, from 65 to 30% by weight of a high-molecular-weight copolymer B comprising ethylene and another olefin having from 4 to 10 carbon atoms, and from 1 to 30% by weight of an ultrahigh-molecular-weight ethylene homopolymer or copolymer C, where all percentages are based on the total weight of the moulding compound.

The invention furthermore also relates to a method for the production of this moulding compound in cascaded suspension polymerization, and to hollow articles made from this moulding compound with very excellent mechanical strength properties.

The polyethylene moulding compound according to the invention has a density in the range $\geq 0.940$ g/cm$^3$ at a temperature of 23° C. and has a broad trimodal molecular weight distribution. The high-molecular-weight copolymer B comprises small proportions of up to 5% by weight of further olefin monomer units having from 4 to 10 carbon atoms. Examples of comonomers of this type are 1-butene, 1-pentene, 1-hexene, 1-octene or 4-methyl-1-pentene. The ultrahigh-molecular-weight ethylene homopolymer or copolymer C may optionally also comprise an amount of from 0 to 10% by weight of one or more of the above-mentioned comonomers.

The moulding compound according to the invention furthermore has a melt flow index, in accordance with ISO 1133, expressed as MFI$_{190/5}$, in the range from 0.01 to 10 dg/min and a viscosity number VN$_{tot}$, measured in accordance with ISO/R 1191 in decalin at a temperature of 135° C., in the range from 190 to 700 cm$^3$/g, preferably from 250 to 500 cm$^3$/g.

The trimodality can be described as a measure of the position of the centres of the three individual molecular weight distributions with the aid of the viscosity numbers VN in accordance with ISO/R 1191 of the polymers formed in the successive polymerization steps. The following band widths of the polymers formed in the individual reaction steps should be taken into account here:

The viscosity number VN$_1$ measured on the polymer after the first polymerization step is identical with the viscosity number VN$_A$ of the low-molecular-weight polyethylene A and is in accordance with the invention in the range from 40 to 180 cm$^3$/g.

VN$_B$ of the relatively high-molecular-weight polyethylene B formed in the second polymerization step can be calculated from the following mathematical formula:

$$VN_B = \frac{VN_2 - w_1 \cdot VN_1}{1 - w_1}$$

where w$_1$ represents the proportion by weight of the low-molecular-weight polyethylene formed in the first step, measured in % by weight, based on the total weight of the polyethylene having a bimodal molecular weight distribution formed in the first two steps, and $VN_2$ represents the viscosity number measured on the polymer after the second polymerization step. The value calculated for $VN_B$ is normally in the range from 150 to 800 cm³/g.

$VN_C$ for the ultrahigh-molecular-weight homopolymer or copolymer C formed in the third polymerization step is calculated from the following mathematical formula:

$$VN_C = \frac{VN_3 - w_2 \cdot VN_2}{1 - w_2}$$

where $w_2$ represents the proportion by weight of the polyethylene having a bimodal molecular weight distribution formed in the first two steps, measured in % by weight, based on the total weight of the polyethylene having a trimodal molecular weight distribution formed in all three steps, and $VN_3$ represents the viscosity number which is measured on the polymer after the third polymerization step and is identical with the $VN_{tot}$ already mentioned above. The value calculated for $VN_C$ is in accordance with the invention in the range from 900 to 3000 cm³/g.

The polyethylene is obtained by polymerization of the monomers in suspension or at temperatures in the range from 20 to 120° C., a pressure in the range from 2 to 60 bar and in the presence of a highly active Ziegler catalyst composed of a transition-metal compound and an organoaluminium compound. The polymerization is carried out in three steps, i.e. in three successive steps, with the molecular weight in each case being regulated with the aid of metered-in hydrogen.

The polymerization catalyst's long-term activity, which is necessary for the cascaded procedure described above, is ensured by a specially developed Ziegler catalyst. A measure of the suitability of this catalyst is its extremely high hydrogen responsiveness and its high activity, which remains constant over a long period of from 1 to 8 hours. Specific examples of a catalyst which is suitable in this manner are the products cited in EP-A-0 532 551, EP-A-0 068 257 and EP-A-0 401 776 of the reaction of magnesium alkoxides with transition-metal compounds of titanium, zirconium or vanadium and an organometallic compound of a metal from groups I, II or III of the Periodic Table of the Elements.

Besides the polyethylene, the polyethylene moulding compound according to the invention may also comprise further additives. Additives of this type are, for example, heat stabilizers, antioxidants, UV absorbers, light stabilizers, metal deactivators, peroxide-destroying compounds, basic costabilizers in amounts of from 0 to 10% by weight, preferably from 0 to 5% by weight, but also fillers, reinforcing agents, plasticizers, lubricants, emulsifiers, pigments, optical brighteners, flame retardants, antistatics, blowing agents or combinations thereof in total amounts of from 0 to 50% by weight, based on the total weight of the mixture.

The moulding compound according to the invention is particularly suitable for the production of hollow articles, such as fuel canisters, chemical-resistant containers, canisters, drums and bottles, by firstly plasticating the polyethylene moulding compound in an extruder at temperatures in the range from 200 to 250° C., and then extruding the compound through a die into a blow mould, and cooling it therein.

For conversion into hollow articles, use can be made of both conventional single-screw extruders having a smooth feed zone and high-performance extruders having a finely grooved barrel and forced conveying feed section. The screws are typically designed as decompression screws with a length of from 25 to 30 D (D=diameter). The decompression screws have a discharge zone in which temperature differences in the melt are compensated and in which the relaxation stresses formed due to shearing are intended to be dissipated.

EXAMPLE 1

According to the Invention

The polymerization of ethylene was carried out in a continuous method in three reactors connected in series. A Ziegler catalyst, a sufficient amount of suspension medium, ethylene and hydrogen were fed into the first reactor. The amount of ethylene and hydrogen was set in such a way that one part by volume of hydrogen was present per nine parts by volume of ethylene.

The catalyst was a Ziegler catalyst as described in Example 2 of WO 91/18934, which had the catalyst component a having the operation number 2.2 therein, and which is added together with a co-catalyst comprising an organometallic compound of a metal from group I, II or III of the Periodic Table of the Elements.

The catalyst was metered continuously into the first reactor with the co-catalyst and triethylamine in the ratio 1:10 (mol/mol).

The polymerization in the first reactor was carried out at a temperature of 76° C. and a pressure of 0.78 MPa for a period of 3.3 hours with a hydrogen content in the gas space of from 67 to 68% by volume.

The suspension from the first reactor was then transferred into a second reactor, in which the amount of hydrogen had been reduced to 5 parts by volume in the gas space and the amount of $C_4$ comonomer had been increased to 5 parts by volume. The reduction in the amount of hydrogen was carried out via interim $H_2$ decompression.

The polymerization in the second reactor was carried out at a temperature of 84° C. and a pressure of 0.5 MPa for a period of 54 minutes.

The suspension from the second reactor was transferred into the third reactor via further interim $H_2$ decompression, by means of which the amount of hydrogen in the gas space of the third reactor is set to ≦5% by volume.

The polymerization in the third reactor was carried out at a temperature of 47° C. and a pressure of ≦0.23 MPa for a period of 30 minutes.

The polymer suspension leaving the third reactor was fed to granulation after removal of the suspension medium and drying.

The viscosity numbers and proportions $w_A$, $w_B$ and $w_C$ of polymer A, B and C applying to the polyethylene moulding compound produced in accordance with Example 1 are given in Table 1 shown below together with the corresponding data for the moulding compounds produced in accordance with the following Examples 2 to 4.

EXAMPLE 2

According to the Invention

Example 1 was repeated with the following changes:

The polymerization in the first reactor was carried out at a temperature of 82° C. and a pressure of 0.89 MPa for a period of 2.6 hours with a hydrogen content of 68% by volume in the gas space of the reactor.

The suspension from the first reactor was then transferred into a second reactor, in which the amount of hydrogen had been reduced to 10 parts by volume in the gas space of the reactor and the amount of $C_4$ comonomer had been increased to 0.7 parts by volume in the gas space at the reactor. The reduction in the amount of hydrogen was again carried out via interim $H_2$ decompression.

The polymerization in the second reactor was carried out at a temperature of 80° C. and a pressure of 0.37 MPa for a period of 66 minutes.

The suspension from the second reactor was transferred into the third reactor, and the amount of hydrogen in the gas space of the third reactor was set to 0.6% by volume and that of $C_4$ comonomer to 0.8% by volume.

The polymerization in the third reactor was carried out at a temperature of 80° C. and a pressure of 0.15 MPa for a period of 36 minutes.

The viscosity numbers and proportions $w_A$, $w_B$ and $w_C$ of polymer A, B and C applying to the polyethylene moulding compound produced in accordance with Example 2 are given in Table 1 shown below together with the corresponding data for the moulding compounds produced in accordance with the other examples.

EXAMPLE 3

According to the Invention

Example 2 was repeated with the following changes:

The polymerization in the first reactor was carried out at a temperature of 80° C. and a pressure of 0.74 MPa for a period of 2.1 hours with a hydrogen content of 65% by volume in the gas space of the reactor.

The suspension from the first reactor was then transferred into a second reactor, in which the amount of hydrogen had been reduced to 4.1 parts by volume in the gas space of the reactor and the amount of $C_4$ comonomer had been increased to 1.1 parts by volume in the gas space of the reactor. The reduction in the amount of hydrogen was again carried out via interim $H_2$ decompression.

The polymerization in the second reactor was carried out at a temperature of 80° C. and a pressure of 0.24 MPa for a period of 54 minutes.

The suspension from the second reactor was transferred into the third reactor, and the amount of hydrogen in the gas space of the third reactor was set to 1.1% by volume and that of $C_4$ comonomer to 0.8% by volume.

The polymerization in the third reactor was carried out at a temperature of 60° C. and a pressure of 0.12 MPa for a period of 30 minutes.

The viscosity numbers and proportions $w_A$, $w_B$ and $w_C$ of polymer A, B and C applying to the polyethylene moulding compound produced in accordance with Example 3 are given in Table 1 shown below together with the corresponding data for the moulding compounds produced in accordance with the other examples.

EXAMPLE 4

According to the Invention

Example 3 was repeated with the following changes:

The polymerization in the first reactor was carried out at a temperature of 80° C. and a pressure of 0.82 MPa for a period of 2.2 hours with a hydrogen content of 74% by volume in the gas space of the reactor.

The suspension from the first reactor was then transferred into a second reactor, in which the amount of hydrogen had been reduced to 4.0 parts by volume in the gas space of the reactor and the amount of $C_4$ comonomer had been increased to 1.3 parts by volume in the gas space of the reactor. The reduction in the amount of hydrogen was again carried out via interim $H_2$ decompression.

The polymerization in the second reactor was carried out at a temperature of 80° C. and a pressure of 0.20 MPa for a period of 54 minutes.

The suspension from the second reactor was transferred into the third reactor, and the amount of hydrogen in the gas space of the third reactor was set to 1.0% by volume and that of $C_4$ comonomer to 1.0% by volume.

The polymerization in the third reactor was carried out at a temperature of 60° C. and a pressure of 0.08 MPa for a period of 30 minutes.

The viscosity numbers and proportions $w_A$, $w_B$ and $w_C$ of polymer A, B and C applying to the polyethylene moulding compound produced in accordance with Example 2 are given in Table 1 shown below together with the corresponding data for the moulding compounds produced in accordance with the other examples.

Comparative Example (CE)

Example 1 was repeated, but with the difference that the polymerization was terminated after the second reaction step.

The polymerization in the first reactor was carried out at a temperature of 84° C. and a pressure of 0.90 MPa for a period of 4.2 hours with a hydrogen content of 76% by volume in the gas space of the reactor.

The suspension from the first reactor was then transferred into a second reactor, in which the amount of hydrogen had been reduced to 3.0 parts by volume in the gas space of the reactor and the amount of $C_4$ comonomer had been increased to 1.9 parts by volume in the gas space of the reactor. The reduction in the amount of hydrogen was again carried out via interim $H_2$ decompression.

The polymerization in the second reactor was carried out at a temperature of 83° C. and a pressure of 0.21 MPa for a period of 80 minutes.

This gave a polyethylene having a bimodal molecular weight distribution, as corresponds to the prior art in accordance with EP-A 603 935.

TABLE 1

| Example | 1 | 2 | 3 | 4 | CE |
|---|---|---|---|---|---|
| $W_A$ | 0.35 | 0.45 | 0.55 | 0.55 | 0.52 |
| $W_B$ | 0.55 | 0.45 | 0.35 | 0.35 | 0.48 |
| $W_C$ | 0.10 | 0.10 | 0.10 | 0.10 | 0 |
| $VN_1$ [cm³/g] | 80 | 80 | 100 | 60 | 55 |
| MFR(2) | 3.5 | 2.3 | 2.3 | 2.0 | 0.7 |
| MFR(3) | 1.2 | 0.7 | 0.55 | 0.56 | — |
| MFR/5 [g/10'] | 1.07 | 0.55 | 0.30 | 0.36 | 0.4 |
| MFR/21.6 [g/10'] | 17.9 | 11 | 9.5 | 13.8 | 13.4 |
| FRR 21.6/5 | 17 | 20 | 31.6 | 36.3 | 33.6 |
| $VN_{tot}$ [cm³/g] | 306 | 325 | 392 | 373 | 329 |
| Density [g/cm³] | 0.954 | 0.952 | 0.953 | 0.954 | 0.954 |
| FT 0° C. [kJ/m²] | 9.6 | 10.7 | 12.6 | 7.8 | 6 |

TABLE 1-continued

| Example | 1 | 2 | 3 | 4 | CE |
|---|---|---|---|---|---|
| FCM [N/mm$^2$] | 1270 | 1200 | 1240 | 1280 | 1275 |
| SR rheometer [%] | 200 | 151 | 153 | 143 | 91 |
| SCR [h] | 3.7 | 16 | 54.2 | 54.1 | 39 |

The abbreviations for the physical properties in Table 1 have the following meanings:

FCM=flexural creep modulus, measured in accordance with ISO 54852-Z4 in N/mm$^2$ as the one-minute value,
SCR=stress cracking resistance of the moulding compound according to the invention. It is determined by an internal measurement method. This laboratory method has been described by M. Fleiβner in Kunststoffe 77 (1987), pp. 45 ff. This publication shows that there is a correlation between the determination of slow crack growth in the creep test on test bars with all-round notches and the brittle branch in the long-term failure test under internal hydrostatic pressure in accordance with ISO 1167. A shortening of the time to failure is achieved by shortening the crack initiation time by the notches (1.6 mm/razor blade) in ethylene glycol as stress crack-promoting medium at a temperature of 80° C. and a tensile stress of 3.5 MPa. The samples are produced by sawing three test specimens measuring 10×10×90 mm out of a pressed sheet with a thickness of 10 mm. The test specimens are provided with all-round notches in the centre using a razor blade in a notching device produced especially for the purpose (shown in FIG. 5 in the publication by Fleiβner). The notch depth is 1.6 mm.
FT=fracture toughness of the moulding compound according to the invention. It is likewise determined by an internal measurement method on test bars measuring 10×10×80 mm which had been sawn out of a pressed sheet with a thickness of 10 mm. Six of these test bars are notched in the centre using a razor blade in the notching device mentioned above. The notch depth is 1.6 mm. The measurement is carried out substantially in accordance with the Charpy measurement method in accordance with ISO 179 with modified test specimens and modified impact geometry (distance between supports). All test specimens are conditioned to the measurement temperature of 0° C. over a period of from 2 to 3 hours. A test specimen is then placed without delay onto the support of a pendulum impact tester in accordance with ISO 179. The distance between the supports is 60 mm. The drop of the 2 J hammer is triggered, with the drop angle being set to 160°, the pendulum length to 225 mm and the impact velocity to 2.93 m/sec. In order to evaluate the measurement, the quotient of the impact energy consumed and the initial cross-sectional area at the notch $a_{FM}$ in mJ/mm$^2$ is calculated. Only values for complete fracture and hinge fracture can be used here as the basis for a common mean (see ISO 179).
SR=swelling rate, measured in a high-pressure capillary rheometer at a shear rate of 1440 1/s in a 2/2 round-hole die with a conical entry (angle=15°) at a temperature of 190° C.

The measurement values clearly show that the moulding compound according to the invention in all cases resulted in better strength properties and also had better processing properties during production.

TABLE 2

For hollow articles testing, 500 ml round bottles were produced on a Bekum BAE 3 under the following conditions and with the following result:

| Example | 1 | 2 | 3 | 4 | CE 1 |
|---|---|---|---|---|---|
| Base slot | 150 | 150 | 150 | 150 | 200 |
| Rotational speed [rpm] | 17.7 | 17.7 | 17.7 | 17.7 | — |
| Blowing time [sec] | 15 | 14.0 | 12.0 | 11.2 | 12 |
| Weight [g] | 41.4 | 37.4 | 36.0 | 35.6 | 38 |
| Wall thickness [mm] | 1.2 | 1.00 | 0.90 | 0.85 | — |
| Weld line thickness [mm] | 2.0 | 2.0 | 1.0 | 1.0 | (0.5) (V notch) |
| Melt fracture [score] | 2 | 2 | 2 | 2 | 2 |
| Fisheyes [score] | 2 | 2 | 2 | 3 | 1 |
| Note | matt | matt | matt | matt | matt |

It can be seen that the moulding compound according to the comparative example forms an excessively thin weld line, which in addition has a V notch, which represents a weak point which may burst under pressure load.

What is claimed is:
1. A polyethylene molding compound which comprises
   (A) from 30 to 60% by weight of low-molecular-weight ethylene homopolymer A which has a viscosity number $VN_A$ in the range from 40 to 150 cm$^3$/g,
   (B) from 30 to 65% by weight of high-molecular-weight copolymer B comprising ethylene and a further olefin having from 4 to 10 carbon atoms which has a viscosity number $VN_B$ in the range from 150 to 800 cm$^3$/g, and
   (C) from 1 to 30% by weight of ultrahigh-molecular-weight ethylene homopolymer or copolymer C which has a viscosity number $VN_C$ in the range from 900 to 3000 cm$^3$/g and the molding compound has a multimodal molecular weight distribution which has an overall density of $\geq 0.940$ g/cm$^3$ and an MFI$_{190/5}$ in the range from 0.01 to 10 dg/min.
2. The polyethylene molding compound according to claim 1, which has excellent convertibility into hollow articles, expressed by a swelling rate in the range from 100 to 300%.
3. A method for the production of the polyethylene molding compound according to claim 1, which comprises carrying out the polymerization of the monomers in suspension at a temperature in the range from 20 to 120° C., a pressure in the range from 2 to 60 bar and in the presence of a Ziegler catalyst which comprises a transition-metal compound and an organoaluminium compound, and the polymerization is carried out in three steps, with the molecular weight of the polyethylene produced in each step in each case being regulated with the aid of hydrogen.
4. The method as claimed in claim 3, wherein the polymerization is carried out in a cascaded suspension polymerization.
5. The polyethylene molding composition according to claim 1, wherein the multimodal molecular weight distribution is a trimodal molecular weight distribution.
6. The polyethylene molding composition according to claim 1, wherein the further olefin is in an amount up to 5% by weight.
7. The polyethylene molding composition according to claim 1, wherein the molding composition contains up to

10% by weight of one or more comonomers selected from the group consisting of 1-butene, 1-pentene, 1-hexene, 1-octene and 4-methyl-1-pentene.

8. The molding compound according to claim 1, wherein the molding compound has a viscosity number $VN_{tot}$ in the range from 190 to 700 cm$^3$/g.

9. The molding compound according to claim 1, wherein the molding compound has a viscosity number $VN_{tot}$ in the range from 250 to 500 cm$^3$/g.

10. An article which comprises the molding composition according to claim 1.

11. The article as claimed in claim 10, wherein the article is a fuel tank, canister, drum or bottle.

12. A process to make an article which comprises plasticating the polyethylene molding composition according to claim 1 in an extruder at temperatures in the range from 200 to 250° C. and then extruding through a die into a blow mold and cooling therein.

* * * * *